United States Patent [19]

Russell et al.

[11] Patent Number: 5,780,769
[45] Date of Patent: Jul. 14, 1998

[54] THERMAL STABILIZATION OF N,N-DINITRAMIDE SALTS

[75] Inventors: Thomas P. Russell, Manassas Park, Va.; Indu B. Mishra, Columbia, Md.

[73] Assignee: The United States of America as represented by the Secretary of the Navy, Washington, D.C.

[21] Appl. No.: 708,001

[22] Filed: Aug. 26, 1996

[51] Int. Cl.⁶ .......................... C06B 31/00; C06B 25/34; C01B 21/20; C07C 111/00
[52] U.S. Cl. .......................... 149/45; 149/109.6; 149/92; 423/385; 423/387; 564/107; 564/109
[58] Field of Search .......................... 149/45, 92, 109.6; 423/385, 387; 564/107, 109

[56] References Cited

U.S. PATENT DOCUMENTS

| | | | |
|---|---|---|---|
| 5,051,533 | 9/1991 | Verkade | 564/13 |
| 5,198,204 | 3/1993 | Bottaro et al. | 423/385 |
| 5,254,324 | 10/1993 | Bottaro et al. | 423/263 |
| 5,292,387 | 3/1994 | Highsmith et al. | 149/19.1 |
| 5,316,749 | 5/1994 | Schmitt et al. | 423/385 |
| 5,415,852 | 5/1995 | Schmitt et al. | 423/385 |
| 5,498,303 | 3/1996 | Hinshaw et al. | 149/19.6 |
| 5,507,893 | 4/1996 | Mullay et al. | 149/92 |

FOREIGN PATENT DOCUMENTS

| | | | |
|---|---|---|---|
| WO 91/19669 | 12/1991 | WIPO | C01B 21/082 |
| WO 91/19670 | 12/1991 | WIPO | C01B 21/082 |
| WO 94/24073 | 10/1994 | WIPO | C06B 45/10 |

OTHER PUBLICATIONS

Lensink C, Xi K, Daniels L M and Verkade J G, The Unusually Robust P-H Bond in the Novel Cation HP(NMeCH₂CH₂)₃N⁺ J. Am. Chem Soc. 1989, 111, 3478–3479.

*Primary Examiner*—Edward A. Miller
*Attorney, Agent, or Firm*—Thomas E. McDonnell; Ralph T. Webb

[57] ABSTRACT

The thermal stability of an N,N-dinitramide salt of the formula $M^+[N(NO_2)_2]^-$ where $M^+$ is a nitrogen-containing cation, is improved by mixing with the N,N-dinitramide salt a compound of the formula

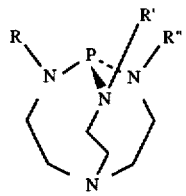

where R, R' and R" are the same or different and are aryl or alkyl. A new composition of matter is formed by mixing the N,N-dinitramide salt and the prophosphatrane compound.

27 Claims, 4 Drawing Sheets

THERMAL STABILIZATION OF N,N-DINITRAMIDE SALTS

BACKGROUND OF THE INVENTION

1. Field of the Invention

The invention relates generally to the stabilization of energetic compounds and, in particular, to methods of improving the thermal stability of ammonium dinitramide and other N,N-dinitramide salts by adding a prophosphatrane compound as a stabilizer.

2. Description of the Related Art

Ammonium dinitramide is an energetic compound recently developed for use as an explosive and as an oxidizer in solid rocket propellant compositions. The compound has an advantage over compounds such as ammonium perchlorate and potassium perchlorate that are currently used as oxidizers in solid propellants in that it does not contain chlorine. Chlorine-containing compound produce an undesirable smoke trail or signature and may be hazardous to the environment.

A disadvantage of ammonium dinitramide is that the compound begins to decompose when exposed to UV radiation between 200 and 330 nm or to temperatures above 55° C. When the compound decomposes, it loses its stored energy and produces a gaseous decomposition product, nitrous oxide ($N_2O$). This quality limits the usefulness of ammonium dinitramide in a propellant, since it can be expected that a propellant will be exposed to UV radiation and temperatures as high as 70° C. (158° F.) during the ordinary course of development, transportation and storage. The production of a gaseous decomposition product during storage of a solid propellant is hazardous.

Other N,N-dinitramide salts of the formula $M^+|N(NO_2)_2|^-$ where $M^+$ is a nitrogen-containing cation have similar advantages and disadvantages.

Attempts have been made to stabilize ammonium dinitramide using potassium dinitramide, potassium fluoride (which can be used to phase stabilize ammonium nitrate (U.S. Pat. No. 4,552,736)), phenylphosphine pentamer, phenylphosphine hexamer and phenylphosphine polymers.

U.S. Pat. No. 5,498,303 to Hinshaw, Wardle and Highsmith describes a propellant formulation that includes ammonium dinitramide and curatives/stabilizers (Col. 4, lines 9–14). The curatives/stabilizers mentioned are 0.4% MNA (N-methyl-p-nitroaniline), 3.11% Desmodur® N-100, a polyisocyanate curative, 0.5% acid scavenger (N,N,N',N'-tetramethyl-1,8-naphthalenediamine (a strong base) and 0.005% TPB (triphenyl bismuth).

U.S. Pat. No. 5,254,324 to Bottaro, Schmitt, Penwell and Ross, U.S. Pat. No. 5,198,204 to Bottaro, Schmitt, Penwell and Ross, and U.S. Pat. No. 5,415,852 to Schmitt, Bottaro, Penwell and Bomberger disclose dinitramide salt compositions of the formula $M^+|N(NO_2)_2|^-$ where $M^+$ is a metal cation or a nitrogen containing cation.

U.S. Pat. No. 5,051,533 describes prophosphatrane compounds ($P(RNCH_2CH_2)_3N$) and discloses that these compounds are very strong Lewis bases, stronger than 1,8-(bisdimethylamino)-naphthalene (another name for N,N,N',N'-tetramethyl-1,8-naphthalenediamine).

SUMMARY OF THE INVENTION

An object of the invention is to improve the thermal stability of ammonium dinitramide or other N,N-dinitramide salts in the temperature range that may be encountered in the development, transportation and storage of the compounds or of propellant formulations containing the compounds. In particular, it is an object of the invention to improve the thermal stability of ammonium dinitramide and other N,N-dinitramide salts for temperatures above 55° C. A further object of the invention is that any additive used to improve the thermal stability of ammonium dinitramide and other N,N-dinitramide salts not contain halogenated or metallic compounds. Halogenated and metallic compounds create a signature when used in a rocket propellant. Metallic compounds tend to have a high molecular mass, which lowers the specific impulse of exhaust gases. A further object of the invention is that any additive used to improve the thermal stability of ammonium dinitramide and other N,N-dinitramide salts be effective in small quantities, preferably in the range of 0.003–1.00% by mole and most preferably in the range of 0.01–0.5% by mole.

These and other objects are achieved by adding to a N,N-dinitramide salt of the formula $M^+|N(NO_2)_2|^-$, where $M^+$ is a nitrogen-containing cation, a prophosphatrane compound of the formula

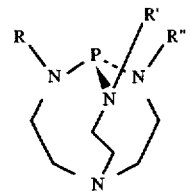

where R, R' and R" are the same or different and are aryl or alkyl.

It has been found that a small amount (as little as 0.003% by mole) of a prophosphatrane compound according to the above formula, when added to ammonium dinitramide, greatly inhibits the thermal degradation of the ammonium dinitramide. In addition, the compound absorbs UV radiation in the range of 200–330 nm and thus may serve to protect ammonium dinitramide from UV-caused degradation. The invention further relates to a composition comprising a N,N-dinitramide salt of the formula $M^+|N(NO_2)_2|^-$, where $M^+$ is a nitrogen-containing cation, and a prophosphatrane compound as described above and to a composition of matter created by combining the N,N-dinitramide salt and a prophosphatrane compound.

for 24 hours. Spectra were collected at 10 hours (FIG. 3), 18 hours (FIG. 4) and 24 hours (FIG. 5).

Figure 6:
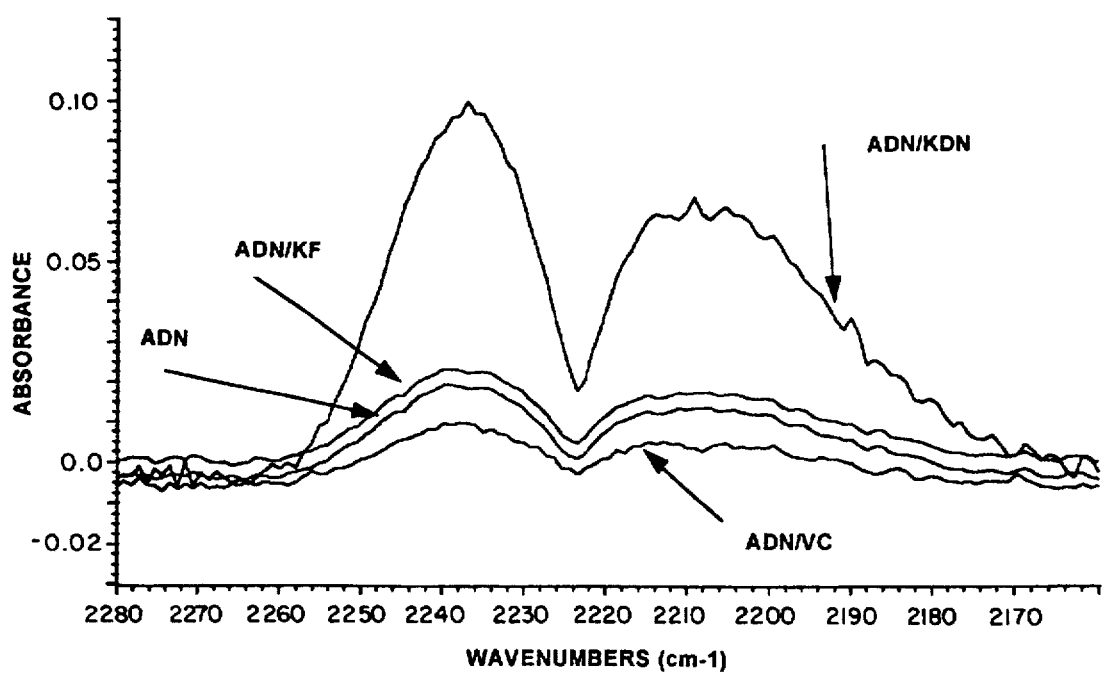
Figure 7:
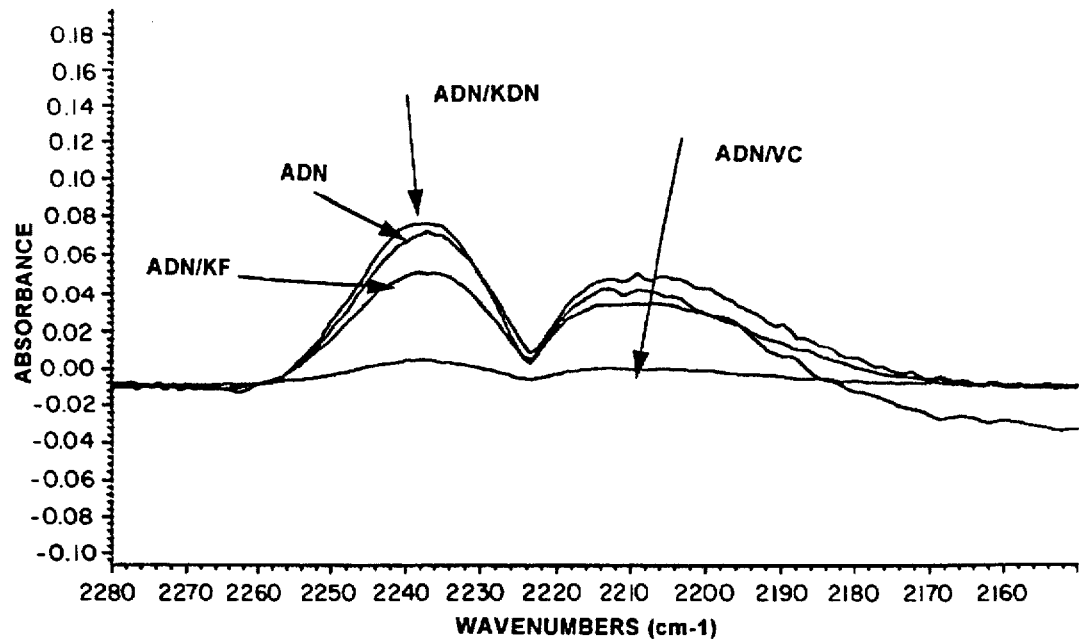
Figure 8:
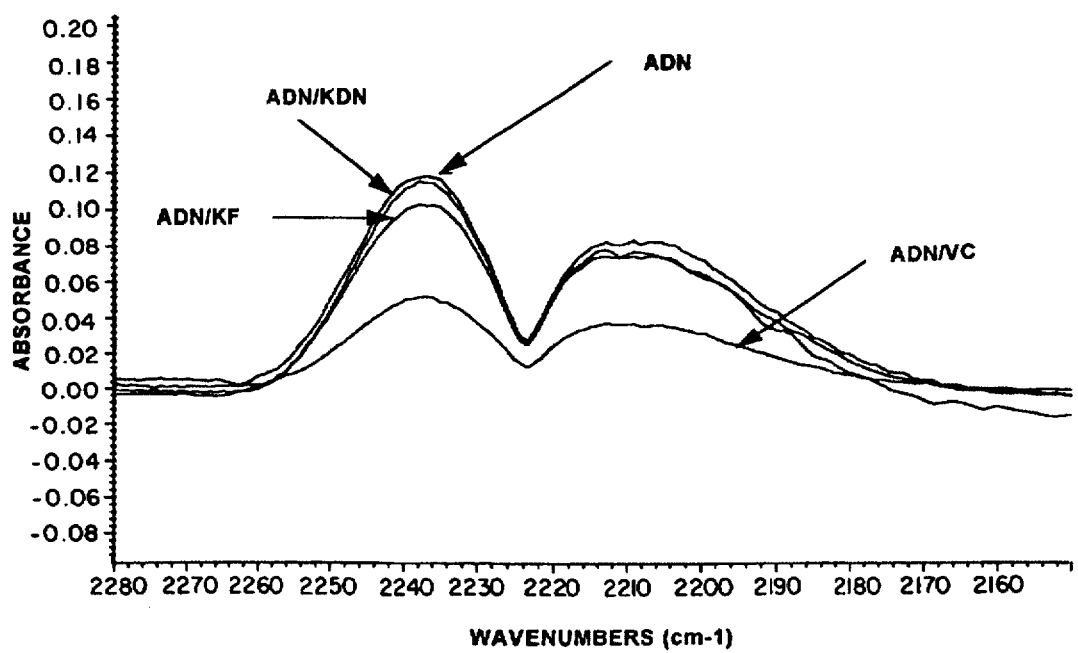

FIGS. 6–8 show superimposed comparative infrared spectra of absorbance versus wavenumber in the range of 2290–2160 cm$^{-1}$ (the range for detecting $N_2O$) for ammonium dinitramide (ADN), a mixture of ammonium dinitramide and P(MeNCH.CH$_2$)$_3$N (ADN/VC), a mixture of ammonium dinitramide and potassium fluoride (ADN/KF) and a mixture of ammonium dinitramide and potassium dinitramide (ADN/KDN). All samples were heated at 90° C. for 24 hours. Spectra were collected at 10 hours (FIG. 6), 18 hours (FIG. 7) and 24 hours (FIG. 8).

DETAILED DESCRIPTION OF THE PREFERRED EMBODIMENTS

Ammonium dinitramide is a solid compound that can be prepared by any method known in the art, including the methods disclosed in U.S. Pat. No. 5,198,204 to Bottaro et al, U.S. Pat. No. 5,316,749 to Schmitt et al, U.S. Pat. No. 5,254,324 to Bottaro et al and U.S. Pat. No. 5,415,852 to Schmitt et al, each patent being incorporated herein in its entirety and for all purposes. The compound, sometimes referred to as ADN or ammonium dinitramide salt, is useful as an explosive and as an oxidizer in solid propellant formulations. Examples of propellant formulations containing ammonium dinitramide are found in U.S. Pat. No. 5,498,303 to Hinshaw, incorporated herein by reference in its entirety and for all purposes.

Other N,N-dinitramide salts of the formula $M^+[N(NO_2)_2]^-$, where $M^+$ is a nitrogen-containing cation, are described in the above-cited patents. The method of the present invention for improving thermal stability of ammonium dinitramide applies to these compounds as well. Preferably, the compounds that are stabilized according to the method of the present invention include N,N-dinitramide salts of the formula $M^+[N(NO_2)_2]^-$ where $M^+$ is selected from the group consisting of an ammonium ion, a monoalkylammonium ion, a dialkyl ammonium ion, a trialkyl ammonium ion, and a tetraalkyl ammonium ion.

According to the present invention, the thermal stability of a N,N-dinitramide salt of the formula $M^+[N(NO_2)_2]^-$, where $M^+$ is a nitrogen-containing cation, is improved by adding to the N,N-dinitramide salt a prophosphatrane compound of the formula

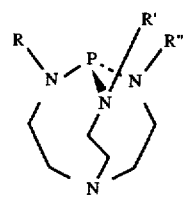

where R, R' and R" are the same or different and are aryl or alkyl.

The identity of the R, R' and R" groups on the prophosphatrane compound affects whether the prophosphatrane compound is a liquid or a solid. For use as a stabilizer in a solid propellant, it is preferred that the prophosphatrane compound be a solid at temperatures up to and including 70° C. Liquid additives or compounds that melt at or below 70° C. may migrate to the surface of the propellant during storage. Prophosphatrane compounds tend to be solid when R, R' and R" are methyl groups, short alkyl chains or small aryl groups. The compounds tend to be liquids when R, R' and R" are groups with more than about 6–8 carbon atoms.

Preferably, in the present invention, R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cyclopentodienyl, phenyl, benzyl, or benzoyl or toluyl. Most preferably, R, R' and R" are methyl. Prophosphatranes used in the present invention are also called proazaphosphatranes, phosphatranes, Verkade's compounds or VC's. When R, R' and R" are alike, the class of compounds may also be referred to as P[(RNCH$_2$CH$_2$)$_3$N]. When R, R' and R" are all methyl groups, the compound may also be referred to by its chemical formula, P[(MeNCH$_2$CH$_2$)$_3$N] or by its chemical name, 2,8,9-trimethyl-1-phospha-2,5,8,9,-tetrazabicyclo[3,3,3] undecane. Prophosphatrane compounds and a method for making them are disclosed in U.S. Pat. No. 5,051,533 to Verkade, incorporated herein by reference in its entirety and for all purposes.

The thermal stablility of N,N-dinitramide salts is improved when only a trace amount of a prophosphatrane compound is added. Preferably, the amount of the prophosphatrane compound is at least 0.003% by molar percent, based on the amount of the N,N-dinitramide salt. Although there is no upper limit to the amount of the prophosphatrane compound that can be used, for practical use in a solid propellant it is preferred that the amount of the prophosphatrane compound not exceed 1.00% by molar percent, based on the amount of the N,N-dinitramide salt. Most preferably the amount of the prophosphatrane compound is 0.01–0.5 by molar percent, based on the amount of N,N-dinitramide salt. Because the prophosphatranes absorb UV light in the range of 200–330 nm, the addition of a prophosphatrane compound will also help to protect N,N-dinitramide salts from UV degradation.

Both the N,N-dinitramide salts and the preferred prophophatrane compounds as defined above are solid compounds that can be made into powders. In practicing the method of this invention, the mixing of the N,N-dinitramide salt and the prophosphatrane compound is accomplished by any mechanical means at any convenient time prior to the long-term storage of the N,N-dinitramide salt or the storage of an explosive or propellant composition containing the N,N-dinitramide salt.

A further aspect of the present invention is a composition comprising a N,N-dinitramide salt of the formula $M^+[N(NO_2)_2]^-$, where $M^+$ is a nitrogen-containing cation, and a prophosphatrane compound of the formula

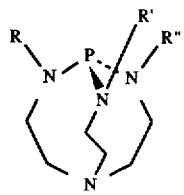

where R, R' and R" are the same or different and are aryl or alkyl. Preferably, R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cyclopentadienyl, phenyl, benzyl, benzoyl or toluyl. Most preferably, R, R' and R" are methyl. The prophosphatrane compound is preferably present in the amount of about 0.003 to about 1% by mole and most preferably in the amount of 0.01–0.5% by mole of the amount of the N,N-dinitramide salt.

Although the inventors do not intend to be bound by any particular theory of the invention, they theorize that the prophosphatrane compound acts as a strong base to remove ammonia from the ammonium dinitramide, forming dinitramidic acid. Free $NH_3$ gas can be detected when ammonium dinitramide and a prophosphatrane compound are mixed. The prophosphatrane compound then deprotonates the dinitramidic acid, thereby forming $\{HP|(RNCH_2CH_2)_3|N\}^+$ and the dinitramide anion, $|N(NO_2)_2|^-$. The dinitramide anion is then protected from further degradation. The prophosphatrane compound is believed to act similarly with other N,N-dinitramide salts. Accordingly, therefore, the invention includes a new composition of matter formed by the process of combining a N,N-dinitramide salt of the formula $M^+|N(NO_2)_2|^-$, where $M^+$ is a nitrogen-containing cation, with a prophosphatrane compound of the formula

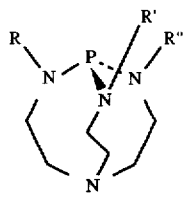

where R, R' and R" are the same or different and are aryl or alkyl. Preferably, R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cyclopentadienyl, phenyl, benzyl, benzoyl or toluyl. Most preferably, R, R' and R" are methyl. The prophosphatrane compound is preferably added in the amount of about 0.003 to about 1% by mole and most preferably in the amount of about 0.01 to about 0.5% by mole of the amount of the N,N-dinitramide salt. It is expected that such a composition of matter would include $\{HP|(RNCH_2CH_2)_3|N\}^+$ and the dinitramide anion, $|N(NO_2)_2|^-$, as well as any unreacted N,N-dinitramide salt or prophosphatrane compound.

In the development, storage and transportation of solid propellants containing ammonium dinitramide or other N,N-dinitramide salts, it is possible for dinitramide salt to be exposed to temperatures in the range of 55° C. to 70° C. for up to 12 hours at a time (during temperature cycles of day (hot) and night (cold)). Therefore, an objective of the present invention is to improve the thermal stability of N,N-dinitramide salts to the extent that they do not decompose when heated at 70° C. for 12 hours. The thermal stability of any given ammonium dinitramide composition can be readily determined by heating the composition to 90° C. and measuring the production of the decomposition products $N_2O$ and ammonium nitrate. Assuming that there is an Arrhenius relationship to the decomposition reaction such that the rate of decomposition doubles for every 10° C. in temperature, the rate of decomposition in the range of 55° C. to 70° C. for 12 hours can be estimated by determining rate of decomposition at 90° C. for 3 hours or less. Other N,N-dinitramide salt compositions can be readily tested in a similar fashion.

The ability of a given prophosphatrane-containing composition to protect ammonium dinitramide against degradation caused by exposure to UV light can also be readily measured by exposing a sample to UV light and measuring the production of the decomposition products $N_2O$ and ammonium nitrate.

Having described the invention, the following examples are given to illustrate specific applications of the invention, including the best mode now known to perform the invention. These specific examples are not intended to limit the scope of the invention described in this application.

EXAMPLE 1

Figure 1:
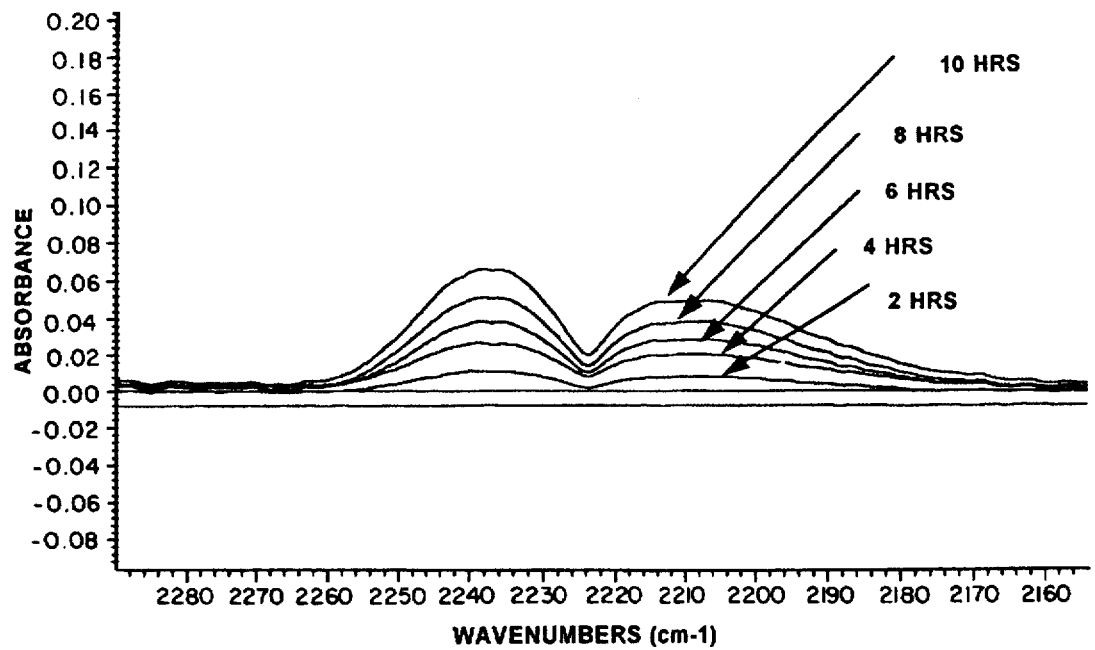
FIG. 1 shows infrared spectra of absorbance versus wavenumber in the range of 2290–2160 $cm^{-1}$ (the range for detecting $N_2O$) for a mixture of ammonium dinitramide and $P(MeNCH_2CH_2)_3N$ that was heated at 90° C. for 20 hours. The infrared spectra were collected every two hours, and the spectra are shown as superimposed on a single graph.

Preparation and testing of a mixture of ammonium dinitramide and $P|(MeNCH_2CH_2)_3N|$ To prepare a mixture of ammonium dinitramide and $P|(MeNCH_2CH_2)_3N|$, 100 mg of ammonium dinitramide (fwt 124, $8.065 \times 10^{-4}$ moles) and 1.00 mg of $P|(MeNCH_2CH_2)_3N|$ (fwt 216, $4.63 \times 10^{-6}$ moles) were thoroughly mixed in a mortar and pestle. The early evolution of $NH_3$ was noticed and increased with time. The mixture was enclosed in an infrared cell and heated to 90° C. The cell had KBr windows and was evacuable and pressurizable. The infrared spectra were collected every two hours. The superimposed infrared spectra of absorbance versus wavenumber in the range of 2290–2160 $cm^{-1}$ (the range for detecting $N_2O$) are shown in FIG. 1. The spectra of FIG. 1 show that only a trace of $N_2O$ was detected for several hours and that the amount of $N_2O$ increased slowly thereafter.

Figure 2:
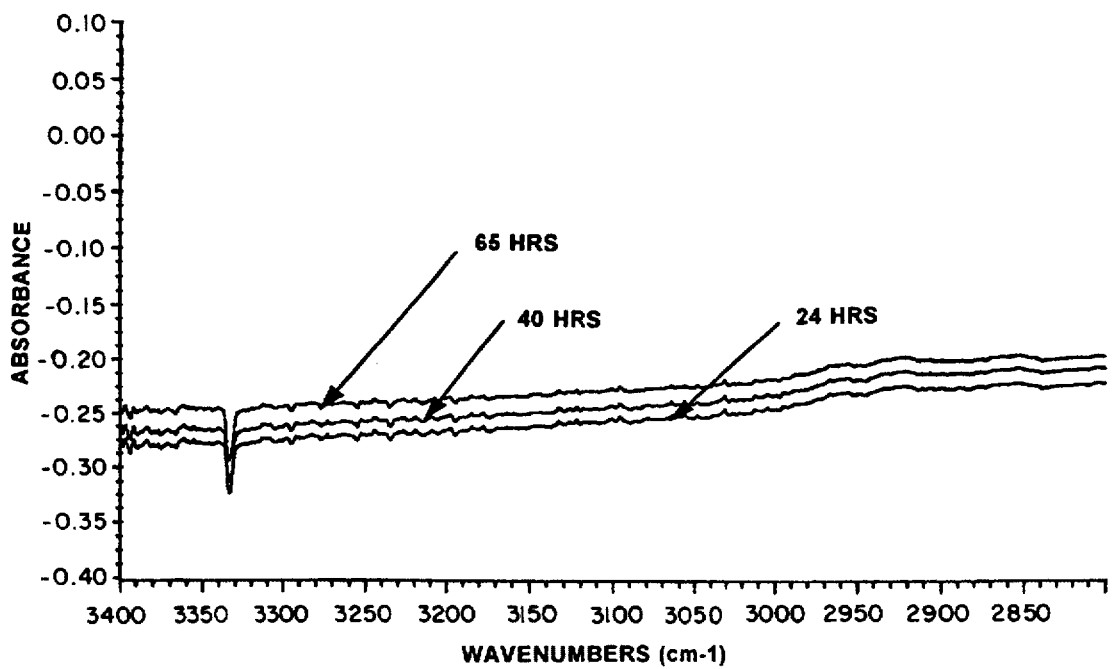
FIG. 2 shows superimposed infrared spectra of absorbance versus wavenumber in the range of 3400–2800 $cm^{-1}$ (the range for detecting ammonium nitrate) for a mixture of ammonium dinitramide and $P(MeNCH_2CH_2)_3N$ that was heated at 90° C. for 65 hours. The infrared spectra were collected at 24, 40 and 65 hours.

The superimposed infrared spectra of absorbance versus wavenumber in the range of 3400–2800 $cm^{-1}$ (the range for detecting ammonium nitrate) for a mixture of ammonium dinitramide and $P(MeNCH_2CH_2)_3N$ that was heated at 90° C. for 65 hours is shown in FIG. 2. The infrared spectra were collected at 24, 40 and 65 hours. The spectra of FIG. 2 show that there was no ammonium nitrate detected during the 65 hour period.

EXAMPLE 2 (COMPARATIVE EXAMPLE)

To 100 mg of ammonium dinitramide, 2.00 mg of phenylphosphine hexamer (fwt. 648, $3.086 \times 10^{-6}$ moles was added and mixed thoroughly as in example 1. The mixture was then heated in an infrared cell with KBr windows and its IR spectra was collected. There was an instantaneous but slow evolution of both $N_2O$ and ammonium nitrate.

EXAMPLE 3 (COMPARATIVE EXAMPLE)

Mixtures were prepared of 100 mg ammonium dinitramide-2.00 mg potassium dinitramide and 100 mg ammonium dinitramide-2.00 mg potassium fluoride in the same manner as example 1. The samples were heated at 90° C. in infrared cells and IR spectra were collected at 10, 18 and 24 hours. Spectra were also collected for a mixture of 100 mg ammonium dinitramide-2.00 mg $P|(MeNCH_2CH_2)_3N|$ and for ammonium dinitramide without any additive.

Figure 3:
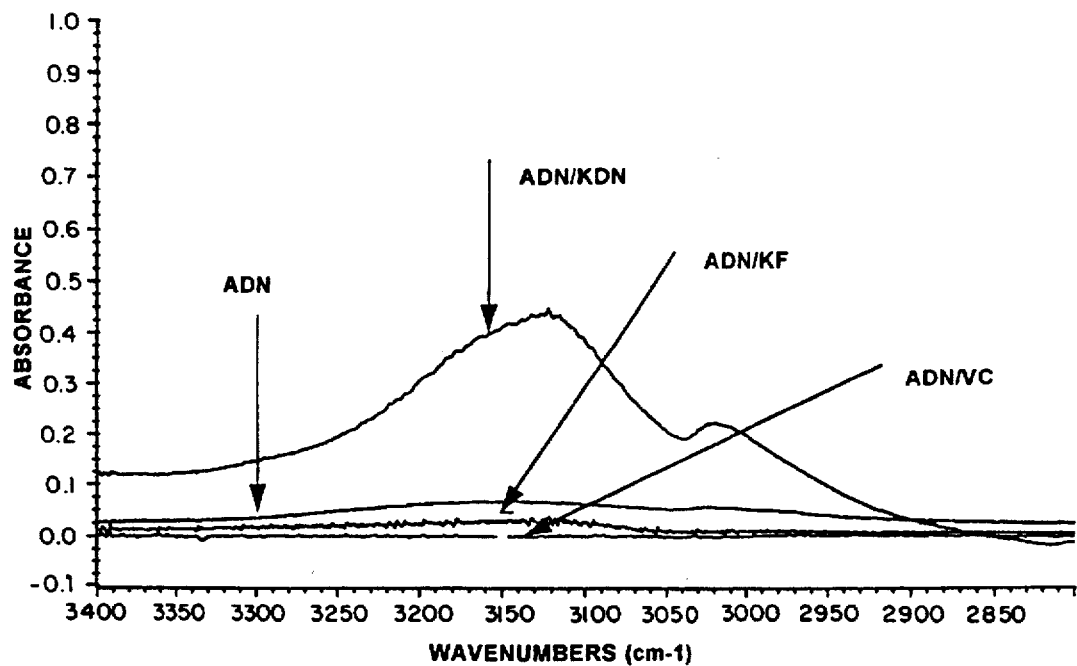
FIGS. 3–5 show superimposed comparative infrared spectra of absorbance versus wavenumber in the range of 3400–2800 $cm^{-1}$ (the range for detecting ammonium nitrate) for ammonium dinitramide (ADN), a mixture of ammonium dinitramide and $P(MeNCH_2CH_2)_3N$ (ADN/VC), a mixture of ammonium dinitramide and potassium fluoride (ADN/KF) and a mixture of ammonium dinitramide and potassium dinitramide (ADN/KDN). All samples were heated at 90° C.
Figure 4:
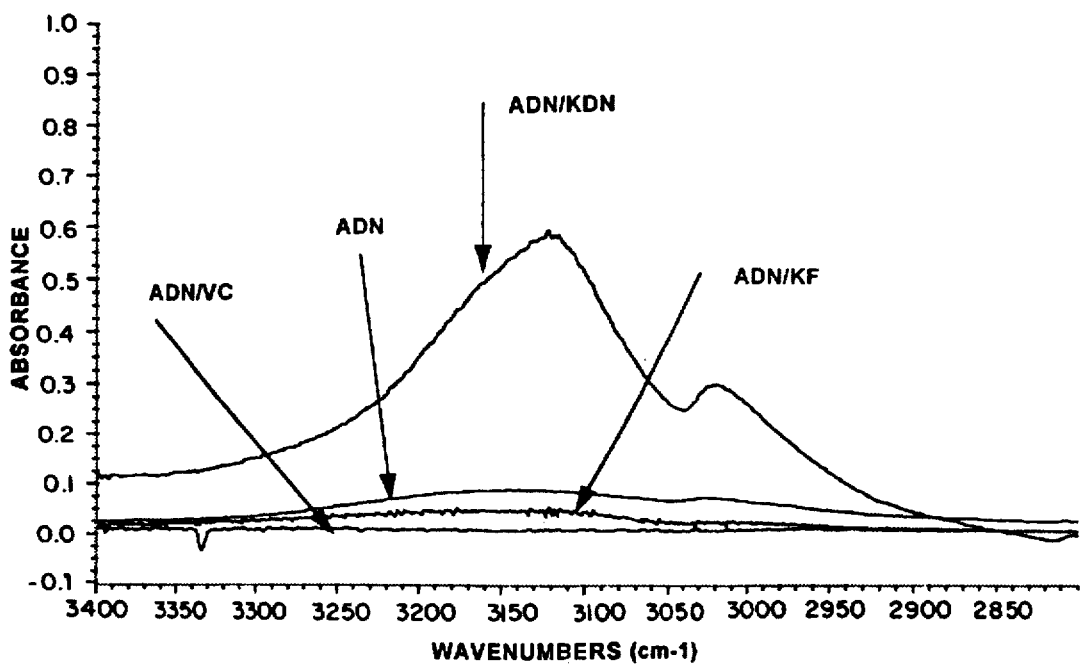
Figure 5:
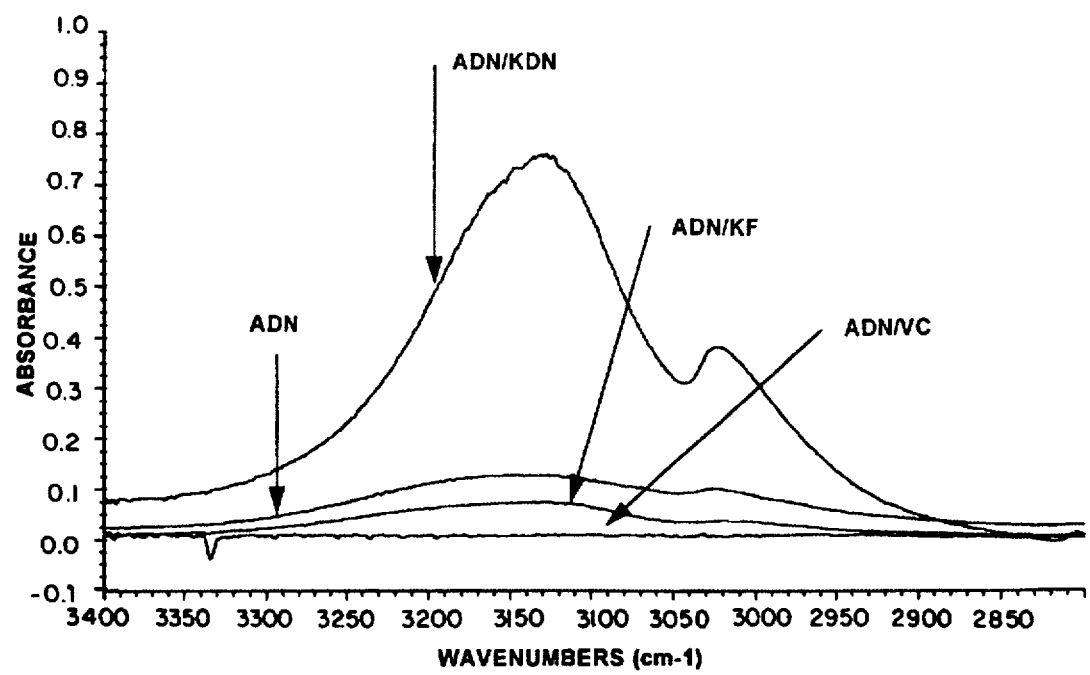

FIGS. 3–5 show superimposed comparative infrared spectra of absorbance versus wavenumber in the range of 3400–2800 $cm^{-1}$ (the range for detecting ammonium nitrate) for ammonium dinitramide (ADN), the mixture of ammonium dinitramide and $P(MeNCH_2CH_2)_3N$ (ADN/VC), the mixture of ammonium dinitramide and potassium fluoride (ADN/KF) and the mixture of ammonium dinitramide and potassium dinitramide (ADN/KDN). The spectra show that ammonium nitrate was not detected in the mixture of ammonium dinitramide and $P(MeNCH_2CH_2)_3N$ but was detected in the other mixtures.

FIGS. 6–8 show superimposed comparative infrared spectra of absorbance versus wavenumber in the range of 2290–2160 $cm^{-1}$ (the range for detecting $N_2O$) for ammonium dinitramide (ADN), the mixture of ammonium dinitramide and $P(MeNCH_2CH_2)_3N$ (ADN/VC), the mixture of ammonium dinitramide and potassium fluoride (ADN/KF) and the mixture of ammonium dinitramide and potassium dinitramide (ADN/KDN). In all the figures, the least amount of $N_2O$ is detected in the sample containing the mixture of ammonium dinitramide and $P(MeNCH_2CH_2)_3N$.

5,780,769

7

Obviously, many modifications and variations of the present invention are possible in light of the above teachings. It is therefore to be understood that, within the scope of the appended claims, the invention may be practiced otherwise than as specifically described.

What is claimed is:

1. A composition comprising
an N,N-dinitramide salt of the formula $M^+[N(NO_2)_2]^-$
where $M^+$ is a nitrogen-containing cation, and
a prophosphatrane compound of the formula

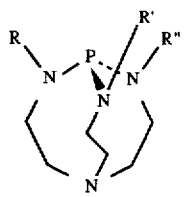

where R, R' and R" are the same or different and are aryl or alkyl.

2. The composition of claim 1, wherein $M^+$ is selected from the group consisting of an ammonium ion, a monoalkylammonium ion, a dialkyl ammonium ion, a trialkyl ammonium ion, and a tetraalkyl ammonium ion.

3. The composition of claim 1 wherein $M^+$ is an ammonium ion.

4. The composition of claim 1 wherein R, R' and R" are selected so that said prophosphatrane compound is a solid at temperatures up to and including 70° C.

5. The composition of claim 1, wherein R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cylcopentadienyl, phenyl, benzyl, benzoyl or toluyl.

6. The composition of claim 1 wherein R, R', and R" are methyl.

7. The composition of claim 1 wherein the amount of said prophosphatrane compound is from about 0.003 to about 1% by mole of the amount of said N,N-dinitramide salt.

8. The composition of claim 1 wherein the amount of said prophosphatrane compound is from about 0.01 to about 0.5% by mole of the amount of said N,N-dinitramide salt.

9. A composition comprising ammonium dinitramide and a prophosphatrane compound of the formula $P[MeNCH_2CH_2CH_2)_3N]$.

10. A composition of matter formed by the process of combining an N,N-dinitramide salt of the formula $M^+[N(NO_2)_2]^+$ where $M^-$ is a nitrogen-containing cation with a prophosphatrane compound of the formula

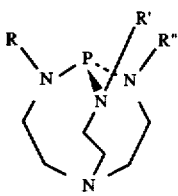

where R, R' and R" are the same or different and are aryl or alkyl.

11. The composition of claim 10, wherein $M^+$ is selected from the group consisting of an ammonium ion, a monoalkylammonium ion, a dialkyl ammonium ion, a trialkyl ammonium ion, and a tetraalkyl ammonium ion.

12. The composition of claim 10 wherein $M^+$ is ammonium ion.

8

13. The composition of claim 10 wherein R, R' and R" are selected so that said prophosphatrane compound is a solid at temperatures up to and including 70° C.

14. The composition of claim 10, wherein R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cylcopentadienyl, phenyl, benzyl, benzoyl or toluyl.

15. The composition of claim 10 wherein R, R', and R" are methyl.

16. The composition of claim 10 wherein the amount of said prophosphatrane compound is from about 0.003 to about 1% by mole of the amount of said N,N-dinitramide salt.

17. The composition of claim 10 wherein the amount of said prophosphatrane compound is from about 0.01 to about 0.5% by mole of the amount of said N,N-dinitramide salt.

18. A composition of matter formed by the process of combining ammonium dinitramide with a prophosphatrane compound of the formula $P[MeNCH_2CH_2)_3N]$ wherein the amount of said prophosphatrane compound is from about 0.003 to about 1% by mole of the amount of the ammonium dinitramide.

19. A method of improving the thermal stability of an N,N-dinitramide salt of the formula $M^+[N(NO_2)_2]^-$ where $M^+$ is a nitrogen-containing cation comprising the step of adding to said N,N-dinitramide salt a prophosphatrane compound of the formula

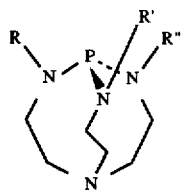

where R, R' and R" are the same or different and are aryl or alkyl.

20. The method of claim 19, wherein $M^+$ is selected from the group consisting of an ammonium ion, a monoalkylammonium ion, a dialkyl ammonium ion, a trialkyl ammonium ion, and a tetraalkyl ammonium ion.

21. The method of claim 19 wherein $M^+$ is an ammonium ion.

22. The method of claim 19 wherein R, R' and R" are selected so that said prophosphatrane compound is a solid at temperatures up to and including 70° C.

23. The method of claim 19, wherein R, R' and R" are selected from the group consisting of methyl, ethyl, propyl, isopropyl, butyl, isobutyl, t-butyl, pentyl, isopentyl, neopentyl, hexyl, heptyl, octyl, cyclopentyl, cyclohexyl, cylcopentadienyl, phenyl, benzyl, benzoyl or toluyl.

24. The method of claim 19 wherein R, R', and R" are methyl.

25. The method of claim 19 wherein the amount of said prophosphatrane compound is from about 0.003 to about 1% by mole of the amount of said N,N-dinitramide salt.

26. The method of claim 19 wherein the amount of said prophosphatrane compound is from about 0.01 to about 0.5% by mole of the amount of N,N-dinitramide salt.

27. A method of improving the thermal stability of ammonium dinitramide comprising the step of adding to ammonium dinitramide a prophosphatrane compound of the formula $P[MeNCH_2CH_2)_3N]$.

* * * * *